(12) United States Patent
Huang et al.

(10) Patent No.: US 9,751,293 B2
(45) Date of Patent: Sep. 5, 2017

(54) LAMINATED SUBSTRATE SEPARATING DEVICE AND METHOD FOR SEPARATING LAMINATED SUBSTRATE

(71) Applicant: Industrial Technology Research Institute, Hsinchu (TW)

(72) Inventors: Guo-Shing Huang, Hsinchu County (TW); Chia-Sheng Huang, Yilan County (TW); Hsin-Yun Hsu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 81 days.

(21) Appl. No.: 14/830,745

(22) Filed: Aug. 20, 2015

(65) Prior Publication Data
US 2016/0159069 A1    Jun. 9, 2016

Related U.S. Application Data

(60) Provisional application No. 62/087,762, filed on Dec. 4, 2014.

(30) Foreign Application Priority Data

Jun. 25, 2015 (TW) .............................. 104120509 A (51) Int. Cl.
*B32B 43/00* (2006.01)
*B32B 38/10* (2006.01)
(Continued)

(52) U.S. Cl.
CPC ........ *B32B 43/006* (2013.01); *B32B 37/0053* (2013.01); *B32B 38/1858* (2013.01);
(Continued)

(58) Field of Classification Search
CPC ......... Y10T 156/1132; Y10T 156/1174; Y10T 156/1944; Y10T 156/195; Y10T 156/1961;
(Continued)

(56) References Cited

U.S. PATENT DOCUMENTS 5,282,918 A * 2/1994 Heist ...................... B26D 3/282
                                                              156/765
5,676,789 A * 10/1997 Hamamura ......... B29C 63/0013
                                                              156/714
(Continued)

FOREIGN PATENT DOCUMENTS

CN          1264156       8/2000
CN        102414780       4/2012
(Continued)

OTHER PUBLICATIONS

"Office Action of Taiwan Counterpart Application", dated Jun. 7, 2016, p. 1-p. 8.
(Continued)

*Primary Examiner* — Mark A Osele
(74) *Attorney, Agent, or Firm* — Jianq Chyun IP Office (57) ABSTRACT

A laminated substrate separating device used for separating a first substrate from a second substrate of a laminated substrate is provided. The first and the second substrates are misaligned at an edge of the laminated substrate. The laminated substrate separating device includes a base where the laminated substrate is disposed thereon, and a separating tool movably disposed on the base along an axis. The separating tool presses a portion of the first substrate being exposed out of the second substrate at a misaligned edge such that a gap is formed between the first and the second substrates. The separating tool inserts into the gap at the misaligned edge to press the first substrate, such that the (Continued)

second substrate is separated from the first substrate. A method for separating laminated substrate is also provided.

21 Claims, 11 Drawing Sheets (51) Int. Cl.
B32B 37/00 (2006.01)
B32B 38/18 (2006.01)
(52) U.S. Cl.
CPC . *B32B 2457/00* (2013.01); *B65H 2301/51122* (2013.01); *Y10T 156/1132* (2015.01); *Y10T 156/1174* (2015.01); *Y10T 156/195* (2015.01); *Y10T 156/1944* (2015.01); *Y10T 156/1967* (2015.01); *Y10T 156/1978* (2015.01)
(58) Field of Classification Search
CPC ......... Y10T 156/1967; Y10T 156/1978; B32B 43/006; B65H 29/54; B65H 2301/51122
See application file for complete search history.

(56) References Cited

U.S. PATENT DOCUMENTS

| | | | |
|---|---|---|---|
| 6,037,026 A | 3/2000 | Iwamoto | |
| 6,258,666 B1* | 7/2001 | Mizutani | C23C 16/01 156/241 |
| 6,376,332 B1 | 4/2002 | Yanagita et al. | |
| 7,034,915 B2 | 4/2006 | Nishiki | |
| 7,980,448 B2 | 7/2011 | Sato et al. | |
| 8,137,502 B2* | 3/2012 | Su | B32B 38/10 156/702 |
| 8,142,610 B2* | 3/2012 | Tani | B08B 7/00 156/715 |
| 8,151,856 B2* | 4/2012 | Kawashima | B29C 63/0013 156/714 |
| 8,409,973 B2* | 4/2013 | Chida | H01L 21/67092 257/E21.237 |
| 8,449,710 B2* | 5/2013 | Furuya | B32B 43/006 156/247 |
| 8,491,955 B2 | 7/2013 | Kim et al. | |
| 8,697,241 B2 | 4/2014 | Takaya et al. | |
| 8,951,387 B2* | 2/2015 | Kang | B29C 63/0013 156/712 |
| 9,099,688 B2* | 8/2015 | Ahn | H01L 51/56 |
| 9,102,430 B2* | 8/2015 | Monti | B65B 69/0033 |
| 2008/0185100 A1* | 8/2008 | Jang | B32B 43/006 156/714 |
| 2008/0236743 A1* | 10/2008 | Kye | B29C 63/0013 156/714 |
| 2011/0048611 A1 | 3/2011 | Carre et al. | |
| 2012/0152465 A1 | 6/2012 | Lindner et al. | |
| 2014/0166186 A1 | 6/2014 | Takaya et al. | |
| 2015/0059987 A1* | 3/2015 | Kumakura | B32B 43/006 156/714 |
| 2015/0122427 A1* | 5/2015 | Koo | B32B 43/006 156/707 |
| 2016/0016397 A1* | 1/2016 | Xie | B32B 43/006 156/758 |

FOREIGN PATENT DOCUMENTS

| | | | | |
|---|---|---|---|---|
| CN | 102612740 | | 7/2012 | |
| CN | 103560101 A | * | 2/2014 | ......... B32B 43/006 |
| CN | 103855324 | | 6/2014 | |
| JP | 5982431 B2 | * | 8/2016 | |
| TW | 507374 | | 10/2002 | |
| TW | 201119930 | | 6/2011 | |
| TW | 201141774 | | 12/2011 | |
| TW | 201318488 | | 5/2013 | |

OTHER PUBLICATIONS

Masteika et al., "A Review of Hydrophilic Silicon Wafer Bonding," ECS Journal of Solid State Science and Technology, Feb. 3, 2014, pp. Q42-Q54.
Hunt et al., "Mechanical Delamination for the Materials Integration," The Electrochemical Society, 2003, pp. 359-367.
Usenko et al., "Silicon Nitride Surface Conversion into Oxide to Enable Hydrophilic Bonding," ECS Transactions, Oct. 2010, pp. 475-483.
Plöβi et al., "Wafer direct bonding: tailoring adhesion between brittle materials," Materials Science and Engineering: R: Reports, Mar. 10, 1999, pp. 1-88.
Masteika et al., "The effect of atmospheric moisture on crack propagation in the interface between directly bonded silicon wafers," Microsystem Technologies, 2013, pp. 705-712.

* cited by examiner

LAMINATED SUBSTRATE SEPARATING DEVICE AND METHOD FOR SEPARATING LAMINATED SUBSTRATE

CROSS-REFERENCE TO RELATED APPLICATION

This application claims the priority benefits of U.S. provisional application Ser. No. 62/087,762, filed on Dec. 4, 2014 and Taiwan application serial no. 104120509, filed on Jun. 25, 2015. The entirety of each of the above-mentioned patent applications is hereby incorporated by reference herein and made a part of this specification.

BACKGROUND OF THE DISCLOSURE

Field of the Disclosure

The disclosure relates to a laminated substrate separating device and a method for separating laminated substrate.

Description of Related Art

Since electronic devices are required to be light and slim, flexible, impact-resistant, safe and easy to carry, etc., it has become a development trend in future to use flexible substrates or thin substrates in fabricating the electronic devices. There are roughly two methods of fabricating electronic elements on such type of substrate, and one method is to directly fabricate the electronic elements on the flexible substrate or the thin substrate, and another method is to indirectly attach the electronic elements on the flexible substrate or the thin substrate.

In order to directly fabricate the electronic elements on the flexible substrate or the thin substrate, the flexible substrate or the thin substrate is first attached to a carrying substrate with a more rigid mechanical property to form a laminated substrate, so as to facilitate transporting the same through a conventional roller and a mechanical arm. Then, the required electronic elements are fabricated on the flexible substrate or the thin substrate. After the electronic elements are fabricated, the flexible substrate or the thin substrate and the electronic elements fabricated on the flexible substrate or the thin substrate have to be separated from the rigid carrier substrate. The flexible substrate or the thin substrate is generally attached to the rigid carrier substrate closely through an adhesion layer to avoid substrate displacement during the fabrication process of the electronic elements. However, such move also causes difficulty in complete separation of the laminated substrate.

SUMMARY OF THE DISCLOSURE

The disclosure is directed to a laminated substrate separating device and a method for separating laminated substrate, so as to separate different substrates of a laminated substrate.

The disclosure provides a laminated substrate separating device for separating a first substrate and a second substrate of a laminated substrate. The first and the second substrates are misaligned at least one edge of the laminated substrate. The laminated substrate separating device includes a base and a separating tool, where the base is configured to carry the laminated substrate, and the laminated substrate exposes the misaligned edge. The separating tool is movably disposed on the base along an axis, and presses against the misaligned edge to produce a gap between the first substrate and the second substrate, and is further inserted into the gap to separate the first substrate and the second substrate.

The disclosure provides a method for separating laminated substrate, which is used for separating a first substrate and a second substrate of a laminated substrate. The first substrate and the second substrate are misaligned at least one edge of the laminated substrate. The method for separating the laminated substrate includes following steps. The laminated substrate is disposed on a base, where the laminated substrate exposes the misaligned edge. A separating tool is used to press against the misaligned edge to separate the first substrate and the second substrate at the misaligned edge.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
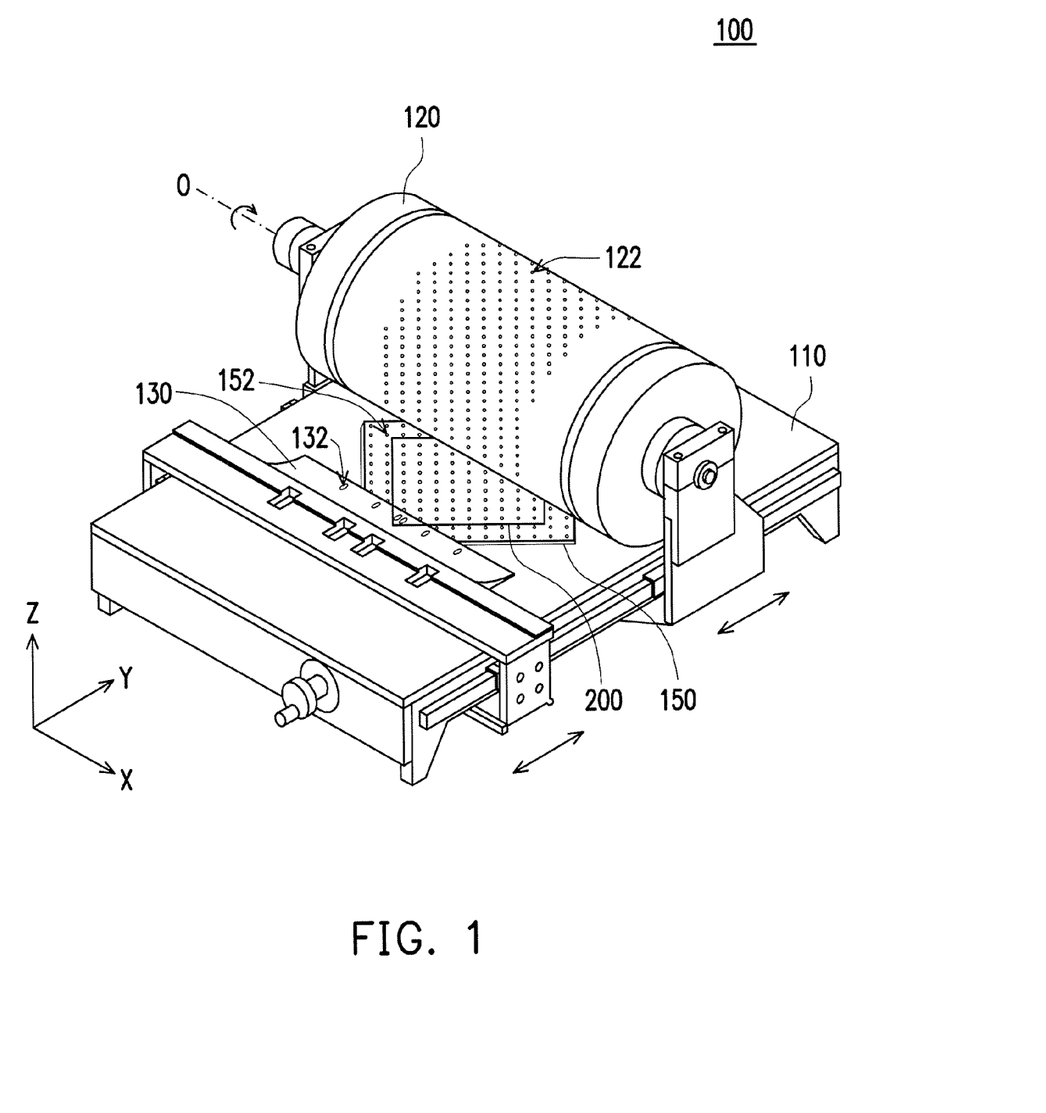
FIG. 1 is a schematic diagram of a laminated substrate separating device according to an embodiment of the disclosure.
Figure 2:
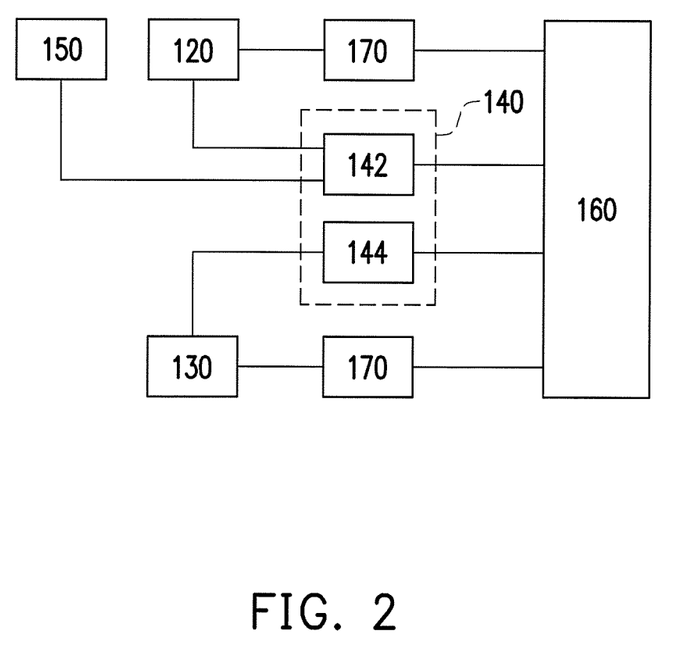
FIG. 2 illustrates a connection relationship between related components of a laminated substrate separating device.
Figure 3:
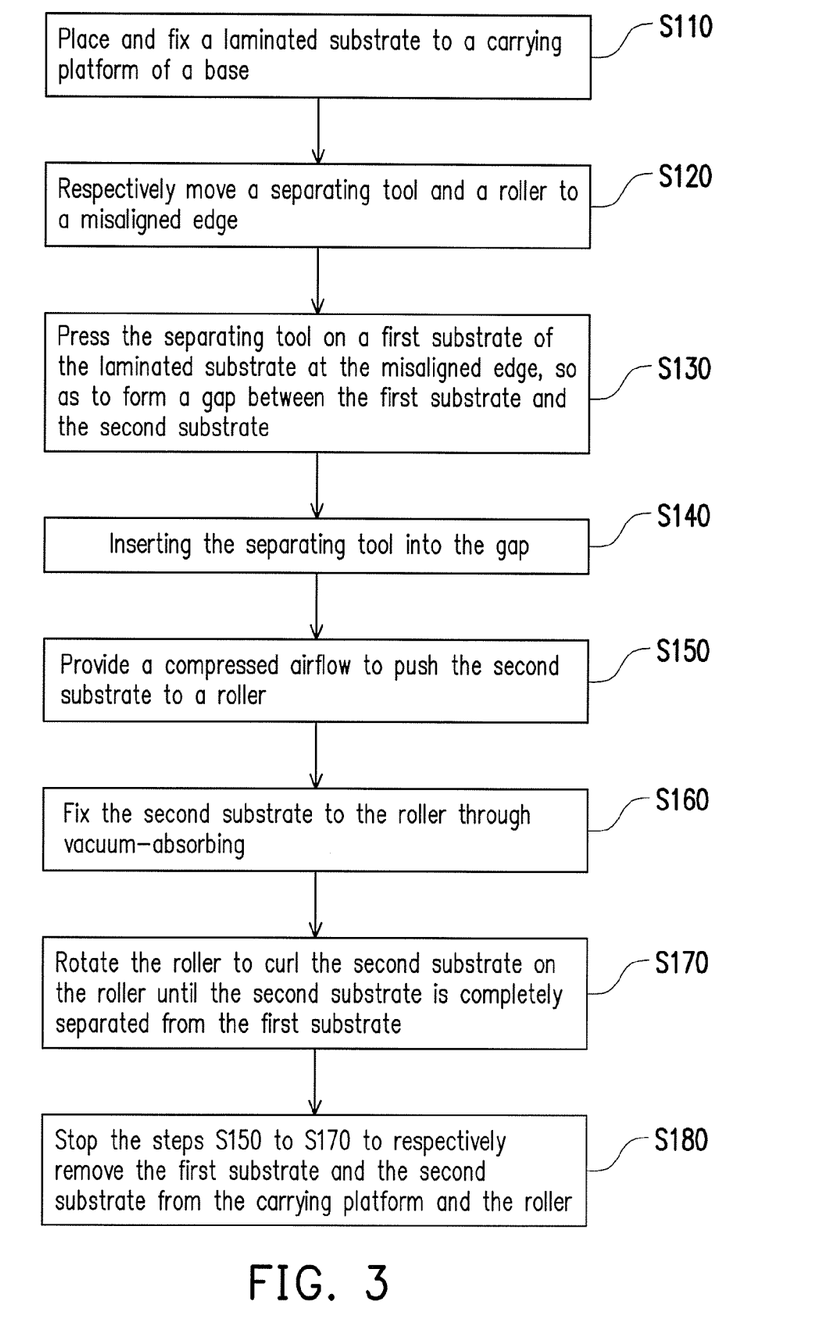
FIG. 3 is a flowchart illustrating a method for separating laminated substrates.
Figure 4:
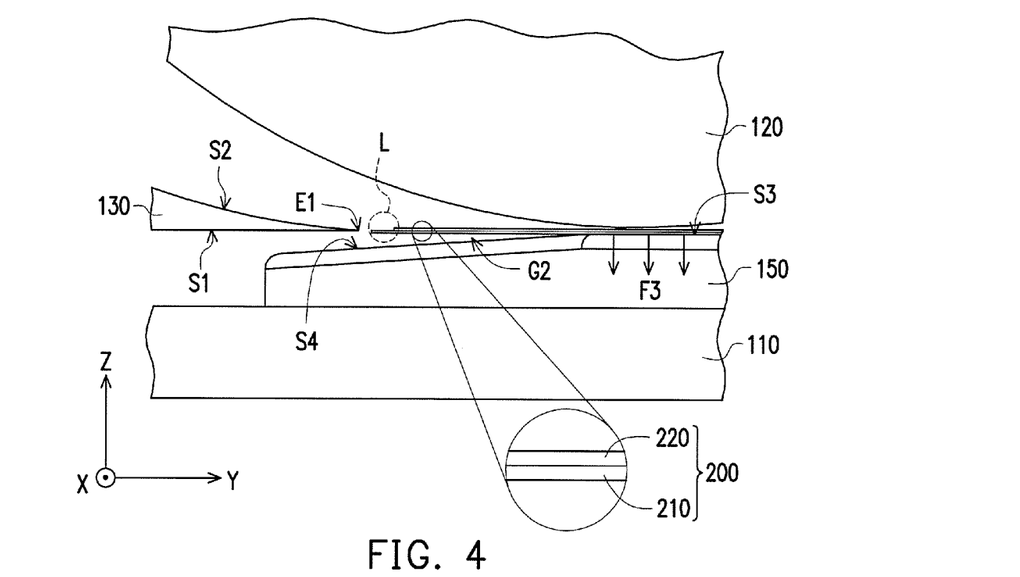
FIG. 4 is a partial enlarged side view of the laminated substrate separating device of FIG. 1.

FIG. 1 is a schematic diagram of a laminated substrate separating device according to an embodiment of the disclosure. FIG. 2 illustrates a connection relationship between related components of the laminated substrate separating device. FIG. 3 is a flowchart illustrating a method for separating the laminated substrate. FIG. 4 is a partial enlarged side view of the laminated substrate separating device of FIG. 1. Referring to FIG. 1, FIG. 2 and FIG. 4, in the present embodiment, the laminated substrate separating device 100 includes a base 110, a roller 120 and a separating tool 130, where a carrying platform 150 is disposed on the base 110, and a laminated substrate 200 to be processed is disposed on the carrying platform 150. The roller 120 and the separating tool 130 are movably disposed on the base 110 along a Y-axis respectively, and are capable of moving back and forth relative to the base 110 along double arrow directions shown in FIG. 1, where the roller 120 can rotate about an X-axis.

As described in the related art, the laminated substrate is not easy to be separated, and in the disclosure, the laminated substrate separating device 100 is used to effectively and completely separate the laminated substrate 200 in a simple manner. It should be noted that the laminated substrate 200 of the present embodiment is composed of a first substrate 210 and a second substrate 220 attached to each other, where the first substrate 210 is a supporting substrate made of a rigid material or having a thicker thickness, and the second substrate 220 is a flexible thin substrate (for example, ultra-thin glass with an average thickness less than 200 μm). It should be noted that the first substrate 210 and the second substrate 220 of the present embodiment are misaligned at least one edge of the laminated substrate 200, i.e. as shown in FIG. 4, the first substrate 210 and the second substrate 220 are not aligned to each other at a misaligned edge L.

On the other hand, the laminated substrate separating device 100 further includes a control module 160, a plurality of moving units 170, a vacuum unit 142 and a pneumatic unit 144, where the moving units 170, the vacuum unit 142 and the pneumatic unit 144 are electrically connected to the control module 160, respectively. As shown in FIG. 2, the separating tool 130 and the roller 120 are respectively assembled to the base 110 through the moving units 170, and are controlled by the control module 160 to move relative to the base 110.

Moreover, the roller 120 has a hollow structure, and has a plurality of first holes 122 on a surface thereof, such that the roller 120 can be connected to the vacuum unit 142 to provide a vacuum-adsorbing force. Similarly, a surface of the carrying platform 150 also has a plurality of second holes 152, which are also connected to the vacuum unit 142, such that when the laminated substrate 200 is disposed on the carrying platform 150, the laminated substrate 200 can be vacuumed to the carrying platform 150.

Figure 5:
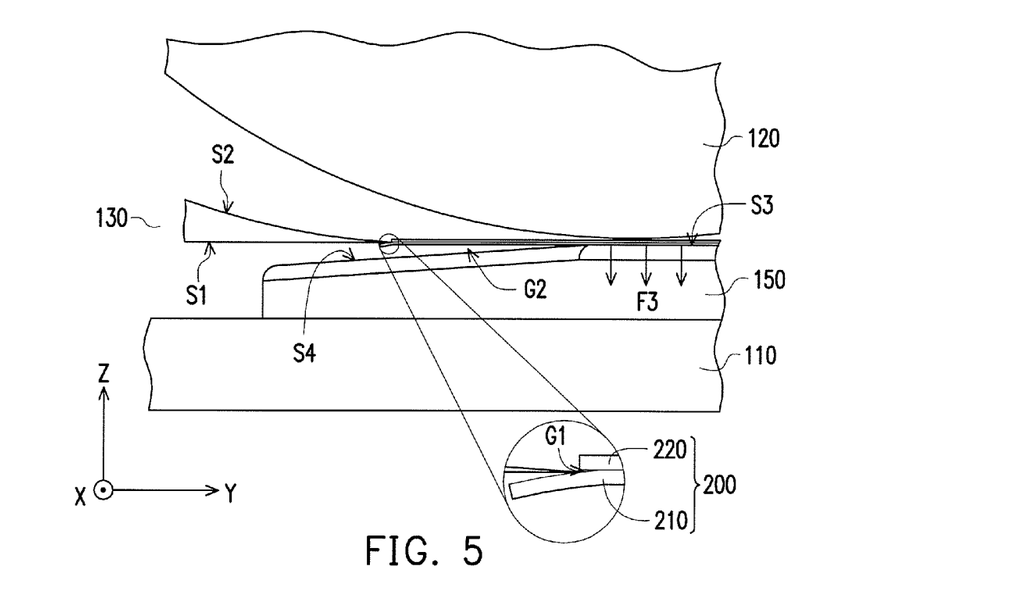
FIG. 5 and FIG. 6 are partial schematic diagrams of the laminated substrate in a separation process
Figure 6:
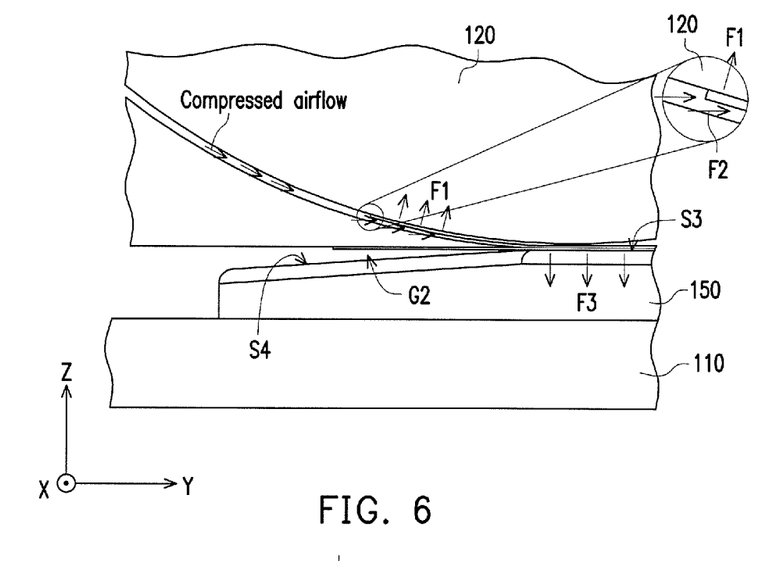

FIG. 5 and FIG. 6 are partial schematic diagrams of the laminated substrate in a separation process. Referring to the flowchart of FIG. 3 and FIG. 4 to FIG. 6, first, in step S110 of the present embodiment, the laminated substrate 200 is firstly disposed on the base 110, where the first substrate 210 is located on the surface of the carrying platform 150, and is vacuumed to and fixed on the carrying platform 150 through the vacuum unit 142. The second substrate 220 is substantially stacked on the first substrate 210, and the first substrate 210 is exposed by the second substrate 220 at the misaligned edge L, which is shown as the misaligned edge L of FIG. 4, where when the laminated substrate 200 is disposed on the carrying platform 150, a part of the first substrate 210 at the misaligned edge L is substantially not shielded by the second substrate 220. In other words, when the user places the laminated substrate 200 on the base 110, the misaligned edge L of the laminated substrate 200 is required to face the separating tool 130.

Then, in step S120, the separating tool 130 and the roller 120 are respectively moved to the misaligned edge L. In step S130, the separating tool 130 presses against the laminated substrate 200 toward a negative Z-axis direction. It should be noted that the separating tool 130 presses against the first substrate 210, i.e. presses against the part of the first substrate 210 at the misaligned edge L exposed by the second substrate 220, as shown in FIG. 5. In this way, the first substrate 210 is deformed towards the negative Z-axis direction under a pressure, and the pressure is greater than an attaching force between the first substrate 210 and the second substrate 220, such that a gap G1 is formed between the first substrate 210 and the second substrate 220 at the misaligned edge L.

It should be noted that the carrying platform 150 of the present embodiment has a plane S3 and an inclined surface S4, where most part of the laminated substrate 200 is disposed on the plane S3, and is vacuumed to and fixed on the plane S3 through the second holes 152. The plane S3 is substantially parallel to an X-Y plane. The inclined surface S4 is connected to the plane S3, and include an angle with the plane S3, as shown in FIG. 4 to FIG. 6, the misaligned edge L of the laminated substrate 200 is substantially located above the inclined surface S4, and a gap G2 exists between the laminated substrate 200 and the inclined surface S4. Therefore, when the first substrate 210 is deformed towards the negative Z-axis direction under the pressure exerted by the separating tool 130, the gap G2 provides a deformation space for the first substrate 210, such that the part (i.e. the part being pressed) of the first substrate 210 exposed by the second substrate 220 is deformed towards the inclined surface S4.

In the present embodiment, the separating tool 130 is, for example, a member having a knife-tip shape, which has a bottom surface S1, a pushing surface S2 and a sharp edge E1, where the sharp edge E1 is substantially connected between the bottom surface S1 and the pushing surface S2. In the above step S130, the separating tool 130 presses against the first substrate 210 through the bottom surface S1 thereof, and after the gap G1 is generated, in step S140, the sharp edge E1 of the separating tool 130 moves along the Y-axis and is inserted into the gap G1, such that the second substrate 220 substantially leans against the pushing surface S2. In this way, the gap G1 becomes a start point for the subsequent substrate separation.

Moreover, the separating tool 130 further has a plurality of third holes 132 (shown in FIG. 1) on the pushing surface S2, and the third holes 132 are connected to the pneumatic unit 144 (shown in FIG. 2). In the present embodiment, the pneumatic unit 144 is controlled by the control module 160 to provide a compressed airflow, and the compressed airflow flows out of the separating tool 130 through the third holes 132. Therefore, after the sharp edge E1 of the separating tool 130 is inserted into the gap G1 as that described in the step S140, in step S150, the second substrate 220 originally leaning against the pushing surface S2 is pushed towards the surface of the roller 120 by the compressed airflow. Moreover, as described above, the roller 120 is connected to the vacuum unit 142 to provide a vacuum-adsorbing force through the first holes 122. Therefore, in step S160, the vacuum unit 142 provides a vacuum-absorbing effect to the second substrate 220 at the first holes 122 through the airflow. In this way, the second substrate 220 can be smoothly transferred from the pushing surface S2 of the separating tool 130 to the surface of the roller 120 via the steps S150 and S160, and is vacuumed to/fixed to the roller 120.

Moreover, the pneumatic unit 144 and the vacuum unit 142 construct a fluid operation module 140, and since both of the two units provide a vacuum-adsorbing force or a pushing force through fluid (air) adjustment, a single module can be used to simultaneously drive the pneumatic unit 144 and the vacuum unit 142 to achieve the fluid adjustment effect through a same pipeline design. For example, when the compressed airflow is generated to the separating tool 130, the vacuum-absorbing effect is generated at the roller 120, so as to achieve the absorbing or pushing effect.

It should be noticed that in FIG. 4 to FIG. 6 of the present embodiment, F1, F2, F3 respectively represent three types of forces (including the vacuum-adsorbing force or the pushing force) exerted to the laminated substrate 200 that are generated due to airflow, where F2 represents a pushing force that the compressed airflow on the separating tool 130 pushes the second substrate 220 to the roller 120, F1 represents a vacuum-adsorbing force generated by the pneumatic unit 144 at the first holes 122 through the airflow, and F3 represents a vacuum-adsorbing force for the laminated substrate 200 that is generated by the pneumatic unit 144 at the carrying platform 150.

Then, in step S170, after the second substrate 220 at the gap G1 is absorbed and fixed to the roller 120, the roller 120 is continually rotated to curl the second substrate 220 on the roller 120, such that the second substrate 220 is gradually separated from the first substrate 210. It should be noted that when the step S170 is executed, the steps S150 and S160 are continually executed until a step S180, by which when the second substrate 220 is completely separated from the first substrate 210, the steps S140 to S150 are ended, and the first substrate 210 and the second substrate 220 are respectively removed from the base 110 and the roller 120 to achieve a final effect of the disclosure.

Figure 7:
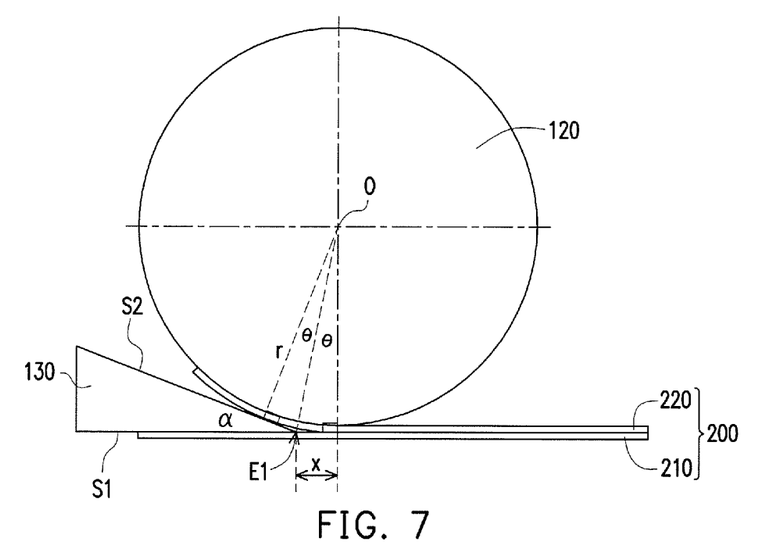
FIG. 7 is a schematic diagram illustrating a size relationship between the laminated substrate separating device of FIG. 1 and a laminated substrate.

FIG. 7 is a schematic diagram illustrating a size relationship between the laminated substrate separating device of FIG. 1 and the laminated substrate. Referring to FIG. 7, in the present embodiment, a required angle condition (i.e. an included angle α between the bottom surface S1 and the pushing surface S2) of the separating tool 130 at the sharp edge E1 is obtained according to a corresponding relationship between the related components and the laminated substrate 200, which is defined as follows. It is assumed that a distance between the separating tool 130 inserted into the gap G1 along the Y-axis and a projection of an central axis O on the laminated substrate 200 is x, a radius of the roller 120 is r, a thickness of the second substrate 220 is t, and θ is an angle of the roller 120 corresponding to insertion of the separating tool 130 inserted into the gap G1, then, $\theta=\tan^{-1}[x/(r+t)]$, and $\alpha \leq 2\theta$. The user can accordingly deduce a pattern of the required separating tool 130 according to the above equation. For example, when the size x of the separating tool 130 inserted into the gap G1 along the Y-axis is 20 mm, the radius r of the roller 120 is 125 mm, the thickness t of the second substrate 220 is 0.1 mm, it is learned that θ is 9.1° according to the above equation. Therefore, the included angle α of the separating tool 130 at the sharp edge E1 is smaller than or equal to 18.2°.

Figure 8:
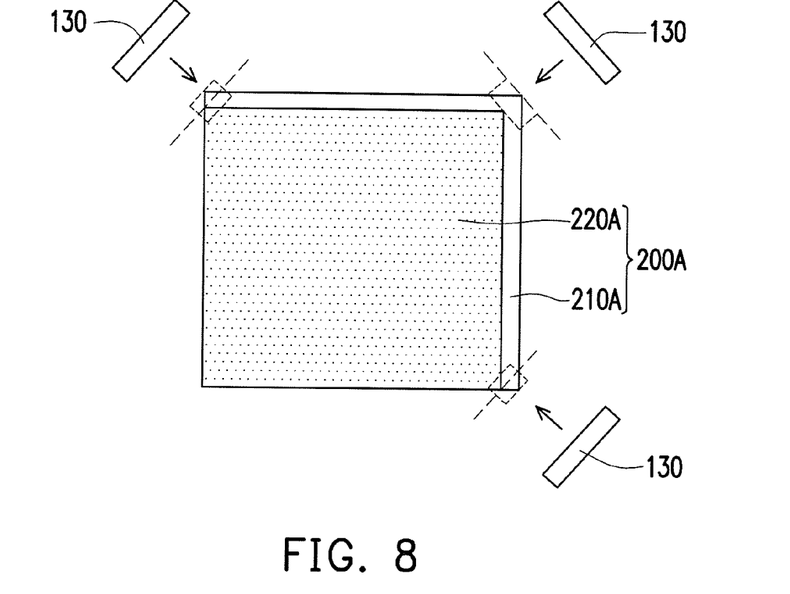
FIG. 8 and FIG. 9 are schematic diagrams of laminated substrates and separating tools according to two embodiments of the disclosure.
Figure 9:
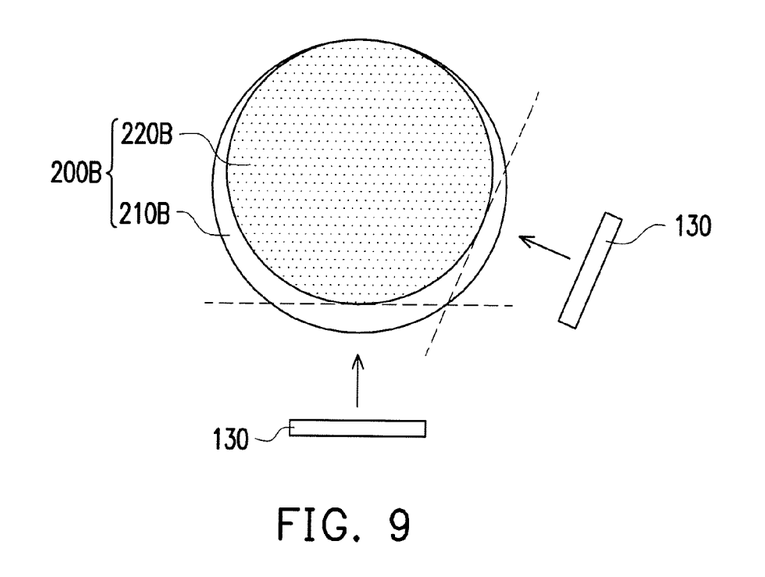

Moreover, FIG. 8 and FIG. 9 are schematic diagrams of laminated substrates and separating tools according to two embodiments of the disclosure. Referring to FIG. 8, a first substrate 210A and a second substrate 220A of a laminated substrate 200A are all polygons (for example, quadrilaterals shown in FIG. 8), and the first substrate 210A and the second substrate 220A are misaligned at three edges, such that in the present embodiment, the separating tool 130 can perform the aforementioned separation operation at one of the three misaligned edges, and preferably, a moving direction (an arrow direction shown in FIG. 8) of the separating tool 130 faces to one of the corners of the polygon, i.e. a weakest part of the attaching force of the laminated substrate 200A, such that the aforementioned steps can be executed to smoothly separate the laminated substrate 200A.

The laminated substrate of FIG. 9 is constructed by attaching a first substrate and a second substrate in a round shape. As shown in FIG. 9, in case that the first substrate 210B and the second substrate 220B of the laminated substrate 200B all have a round shape, the first substrate 210B and the second substrate 220B are misaligned at most of the circumference, so that in the present embodiment, as long as a moving direction (an arrow direction shown in FIG. 9) of the separating tool 130 towards the laminated substrate 200B is orthogonal to one of tangent lines (for example, dot lines shown in FIG. 9) of the round second substrate 220B, the effect of separating the laminated substrate 200B according to the aforementioned method is achieved, and preferably, the moving direction of the separating tool 130 substantially faces to a center of circle of the round second substrate 220B.

Figure 10:
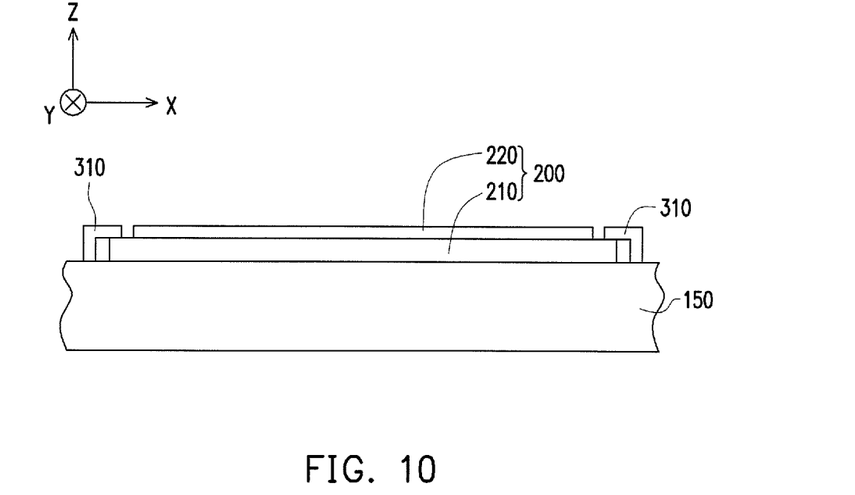
FIG. 10 and FIG. 11 are schematic diagrams respectively illustrating the laminated substrate disposed on a carrying platform according to different embodiments of the disclosure.
Figure 11:
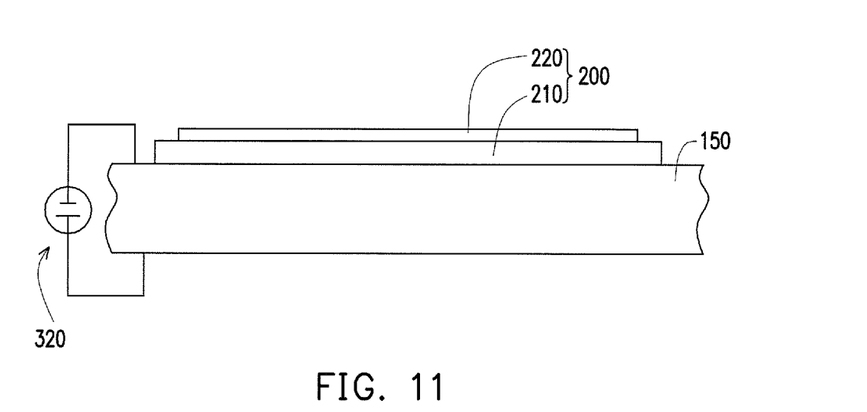

FIG. 10 and FIG. 11 are schematic diagrams respectively illustrating the laminated substrate disposed on the carrying platform according to different embodiments of the disclosure. Referring to FIG. 10, the base 110 further includes a clamping fixture 310 assembled to the carrying platform 150, such that the laminated substrate 200 disposed on the carrying platform 150 can be clamped and fixed, where the clamping fixture 310 substantially presses against the first substrate 210. Referring to FIG. 11, in the present embodiment, the laminated substrate 200 is fixed on the carrying platform 150 through an electrostatic generator 320, i.e. the electrostatic generator 320 produce a specific electrostatic polarity on the carrying platform 150 to achieve an effect of absorbing the laminated substrate 200. Therefore, the method of fixing the laminated substrate 200 to the carrying platform 150 is not limited by the disclosure. In another embodiment that is not illustrated, the laminated substrate 200 can also be fixed on the carrying platform 150 through a transient attaching manner, i.e. during the attaching process, a bonding effect is achieved by forming a van der Waals force, a covalent bonding force or a chemical bonding force between the laminated substrate 200 and the base 110, and after the second substrate 200 is removed from the first substrate 210, the first substrate 210 can be disassembled from the base 110 by releasing the aforementioned bonding force.

Figure 12:
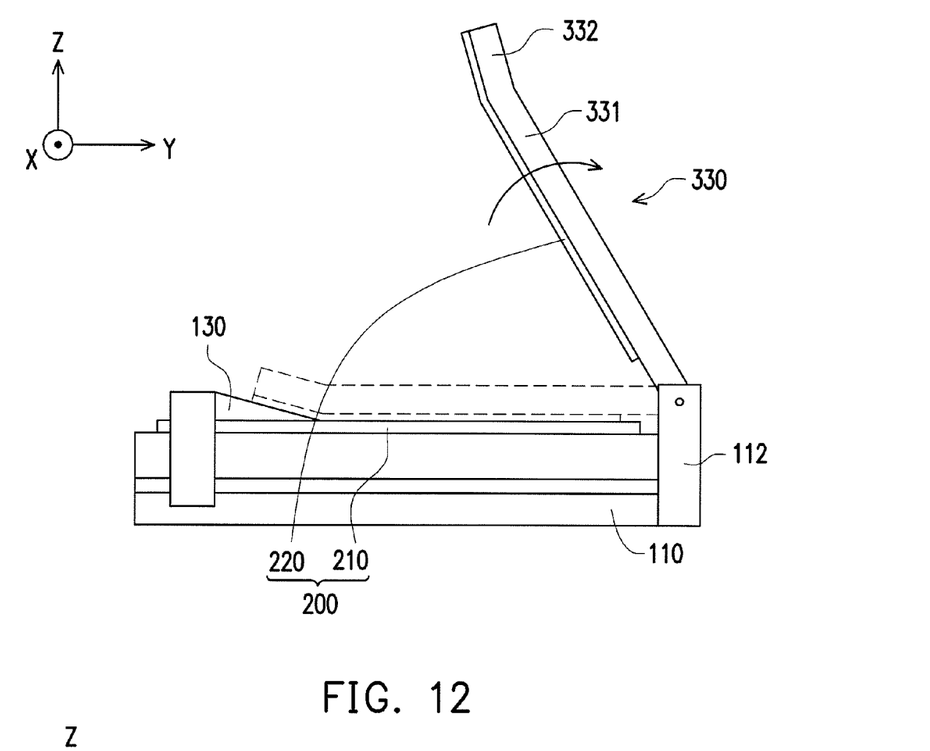
FIG. 12 and FIG. 13 are schematic diagrams illustrating separation of the laminated substrate according to different embodiments of the disclosure.
Figure 13:
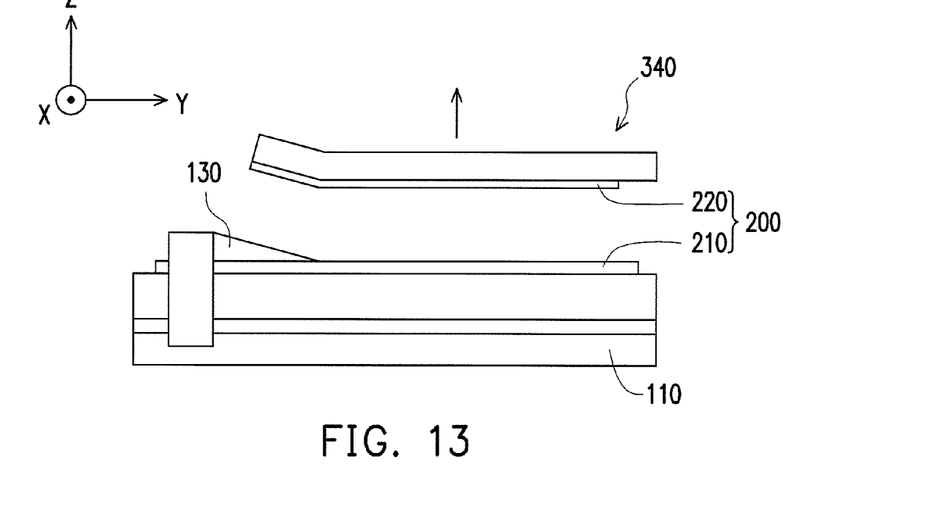

FIG. 12 and FIG. 13 are schematic diagrams illustrating separation of the laminated substrate according to different embodiments of the disclosure. Referring to FIG. 12, the base 110 of the present embodiment further includes a moving fixture 330, and the moving fixture 330 includes rotation arms 331 and 332, where the rotation arm 331 is pivoted to a bracket 112 of the base 110, and the rotation arm 332 is disposed on the rotation arm 331 and extends along a direction away from the bracket 112 from one end of the rotation arm 331, such that the rotation arms 331 and 332 are rotatable and connected to the base (about the X-axis). Moreover, the moving fixture 330 is also connected to the vacuum unit 142 (shown in FIG. 2) for providing a vacuum-absorbing force to the second substrate 220. In this way, the second substrate 220 can be absorbed on the rotation arms 331 and 332. After the separating tool 130 moves along the Y-axis and is inserted into the gap G1 (as described above), the second substrate 200 can be separated from the first substrate 210 by rotating the rotation arms 331 and 332. Referring to FIG. 13, different to the embodiment of FIG. 12, a moving fixture 340 moves along the Z-axis in a manner parallel to the X-Y plane, which is different to the rotation of the aforementioned moving fixture 330. It should be noted that the moving fixture can be a part of the laminated substrate separating device as shown in FIG. 12, and can also be a separated structure relative to the laminated substrate separating device that is held by the user during the separation process as shown in FIG. 13, which is not limited by the disclosure, i.e. as long as the moving fixture can be used to separate the second substrate according to the manners disclosed above, it is adapted to the embodiments of the disclosure.

In another embodiment, the separating tool 130 in FIG. 12 and FIG. 13 can also be connected to the pneumatic unit 144 (shown in FIG. 2), such that the compressed airflow generated along a wedge surface can push the second substrate 220 away to facilitate the separation process.

Figure 14:
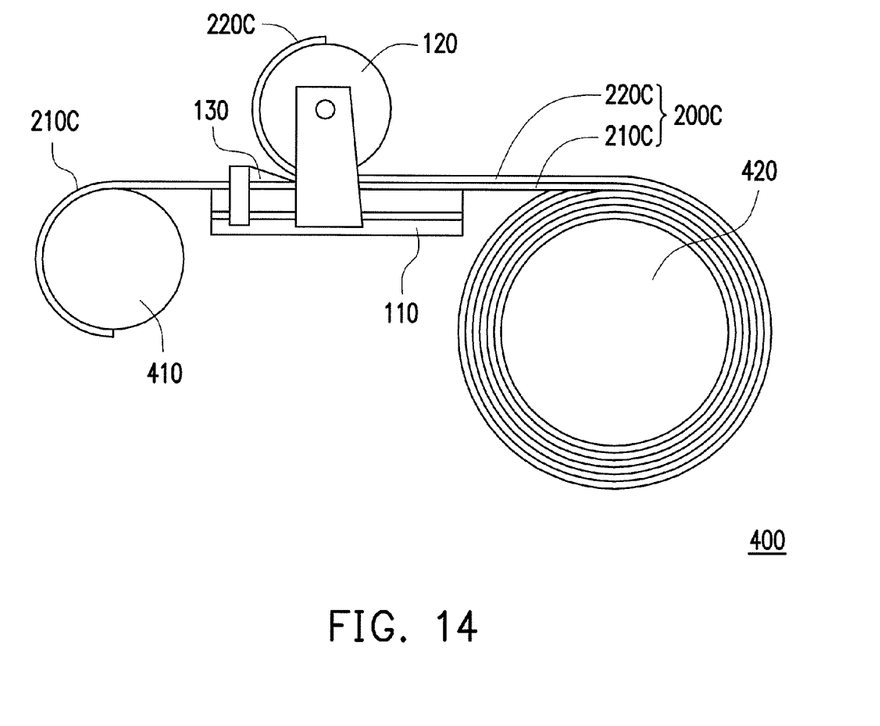
FIG. 14 is a schematic diagram of a laminated substrate separating device according to another embodiment of the disclosure.

FIG. 14 is a schematic diagram of a laminated substrate separating device according to another embodiment of the disclosure. Referring to FIG. 14, the laminated substrate separating device 400 is adapted to a roll-to-roll structure, and is adapted to the situation that the laminated substrate 200C has a flexible first substrate 210C and a flexible second substrate 220C. In the present embodiment, the laminated substrate separating device 400 includes the base 110, the separating tool 130 and a plurality of rollers 120, 410 and 420, where the base 110, the separating tool 130 and the roller 120 are as that described in the aforementioned embodiment, and details thereof are not repeated. The roller 420 is used for releasing the unseparated laminated substrate 200C in a curling state, and the roller 410 is used for curling the first substrate 210C after the second substrate 220C is separated from the first substrate 210C.

Figure 15:
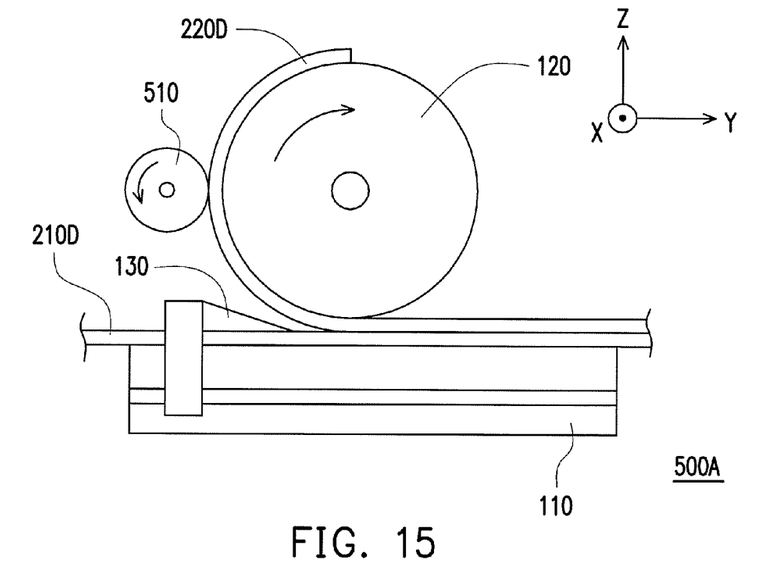
FIG. 15 to FIG. 18 are schematic diagrams illustrating methods for holding a separated second substrate according to different embodiments of the disclosure

FIG. 15 to FIG. 18 are schematic diagrams illustrating methods for holding the separated second substrate according to different embodiments of the disclosure, and by using these methods, a situation that the second substrate is warped at the roller 120 is avoided. Referring to FIG. 15, a laminated substrate separating device 500A further includes a roller 510 disposed beside the roller 120 for clamping and supporting a second substrate 220D separated from a first substrate 210D, such that the second substrate 220D can be tightly absorbed to the surface of the roller 120.

Figure 16:
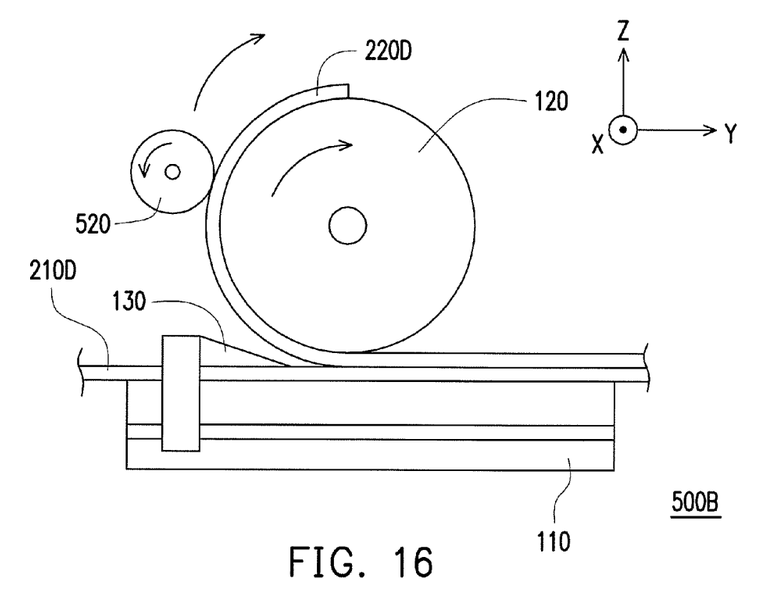

Referring to FIG. 16, different to the embodiment of FIG. 15, a roller 520 of a laminated substrate separating device 500B is movably disposed beside the roller 120, such that besides the roller 520 rotates by itself, the roller 520 is also revolvable around the roller 120.

Figure 17:
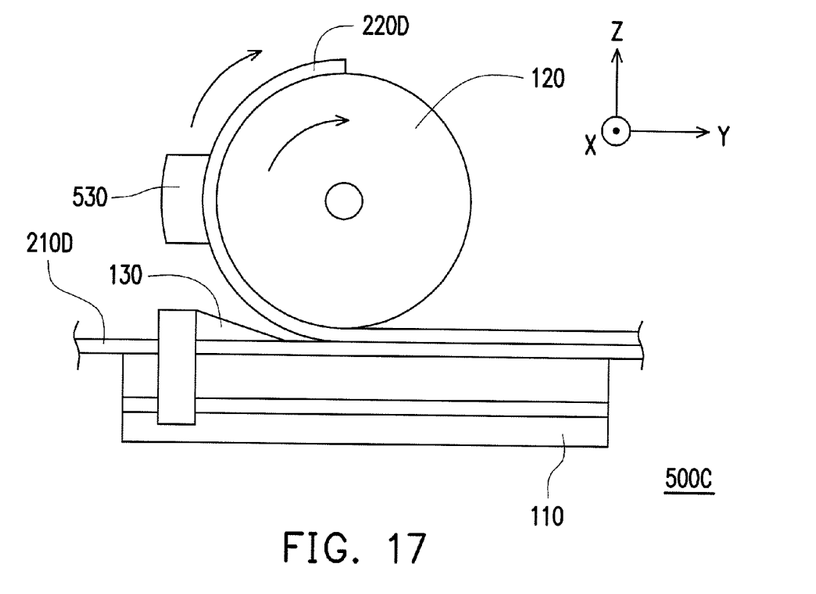

Referring to FIG. 17, in a laminated substrate separating device 500C of the present embodiment, a clamping block 530 is used to replace the aforementioned rollers 510 and 520, and the clamping block 530 does not rotate about the X-axis, but revolves around the roller 120. Moreover, the clamping block 530 can support or clamp the separated second substrate 220D on the surface of the roller 120 through a larger contact surface, i.e. the second substrate 220D is movably clamped between the contact surface and the roller 120, where a surface contour of the contact surface and a surface contour of the roller 120 are complementary.

Figure 18:
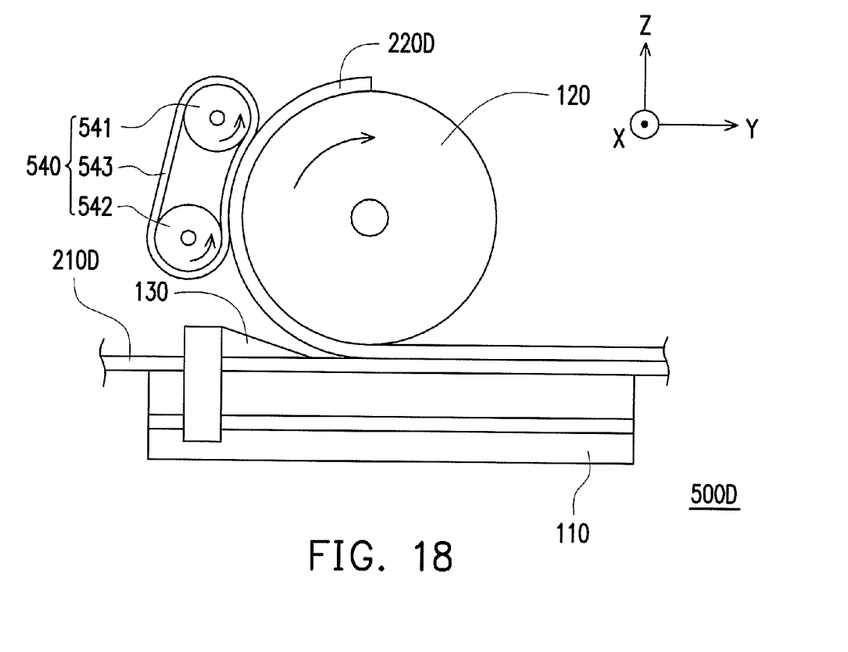

Referring to FIG. 18, a laminated substrate separating device 500D further includes a driving pulley set 540, which includes a pair of pulleys 541 and 542 and a belt 543 around the pulleys. When the second substrate 220D is separated from the first substrate 210D, besides that the second substrate 220D is vacuumed to the roller 120, the second substrate 220D is also clamped and supported by the belt 543, where a space between the pulleys 541 and 542 can be suitably adjusted such that the belt 543 can provide a suitable supporting force to the second substrate 220D.

In summary, in the embodiments of the disclosure, since the first substrate and the second substrate of the laminated substrate are misaligned at the edge, the separating tool of the laminated substrate separating device can press the first substrate at the misaligned edge to deform the first substrate relative to the second substrate, so as to generate a gap between the first substrate and the second substrate. In this way, the sharp edge of the separating tool can be inserted into the gap to push the second substrate upward. Meanwhile, by using the vacuum unit to produce a vacuum-absorbing effect to the second substrate at the surface of the roller and using the pneumatic unit to produce a pushing effect to the second substrate at the surface of the separating tool, the second substrate can be fixed to the roller. Therefore, when the roller continually rotates, the second substrate is curled to the roller, and meanwhile the second substrate is gradually separated from the first substrate. In this way, separation of the laminated substrate is achieved. Based on related mechanism of the laminated substrate separating device corresponding to the laminated substrate, separation of the laminated substrate is achieved through a simple and effective manner.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A laminated substrate separating device, configured to separate a first substrate and a second substrate of a laminated substrate, wherein the first substrate and the second substrate are misaligned at least one edge of the laminated substrate, the laminated substrate separating device comprising:
   a base, configured to carry the laminated substrate, and the laminated substrate exposes the misaligned edge;
   a separating tool, movably disposed on the base along an axis, and pressing against the misaligned edge to produce a gap between the first substrate and the second substrate, and inserted into the gap to separate the first substrate and the second substrate;
   a roller, movably disposed on the base along the axis, and having a plurality of first holes, wherein a portion of the second substrate separated from the first substrate is vacuumed to the first holes and rolled up by the roller; and
   a supporting member, disposed beside the roller, wherein the portion of the second substrate separated from the first substrate is rolled up by the roller and is movably clamped between the supporting member and the roller.

2. The laminated substrate separating device as claimed in claim 1, wherein the supporting member is another roller.

3. The laminated substrate separating device as claimed in claim 2, wherein the another roller is rotatable and revolvable around to the roller.

4. The laminated substrate separating device as claimed in claim 1, wherein the supporting member is a clamping block disposed beside the roller and rotatable relative to the roller, the clamping block has a contact surface, the second substrate is movably clamped between the contact surface and the roller, and a surface contour of the contact surface and a surface contour of the roller are complementary.

5. The laminated substrate separating device as claimed in claim 1, wherein the supporting member is a driving pulley set.

6. The laminated substrate separating device as claimed in claim 1, wherein a distance between the separating tool inserted into the gap along the axis and a projection of a central axis of the roller on the laminated substrate is x, a radius of the roller is r, a thickness of the second substrate is t, and an included angle of the separating tool at a sharp tip is α, then:

$$\theta = \tan^{-1}[x/(r+t)], \text{ and } \alpha \leq 20.$$

7. The laminated substrate separating device as claimed in claim 1, wherein the first substrate or the second substrate is a flexible ultra-thin glass.

8. The laminated substrate separating device as claimed in claim 1, wherein the laminated substrate separating device is adapted to a roll-to-roll structure.

9. The laminated substrate separating device as claimed in claim 1, further comprising:
   a control module; and
   a plurality of moving modules, electrically connected to the control module, wherein the roller and the separating tool are correspondingly disposed on the moving modules, and are controlled by the control module to move along the axis.

10. The laminated substrate separating device as claimed in claim 1, further comprising:
   a control module; and
   a vacuum unit, connected to the first holes and electrically connected to the control module, wherein the control module drives the vacuum unit to provide a vacuum-adsorbing force to the second substrate through the first holes.

11. The laminated substrate separating device as claimed in claim 10, wherein the base has a plurality of second holes connected to the vacuum unit, so as to provide the vacuum-adsorbing force to the first substrate through the second holes.

12. The laminated substrate separating device as claimed in claim 1, wherein the separating tool has a bottom surface, a pushing surface and a sharp edge connected between the bottom surface and the pushing surface, the sharp edge is adapted to be inserted into the gap, the bottom surface presses the first substrate, and the pushing surface pushes the second substrate to the roller.

13. The laminated substrate separating device as claimed in claim 12, wherein the separating tool further has a plurality of third holes located on the pushing surface, and the laminated substrate separating device further comprises:
   a control module; and
   a pneumatic unit, connected to the third holes and electrically connected to the control module, and controlled by the control module to push the second substrate toward the roller through the third holes.

14. The laminated substrate separating device as claimed in claim 12, wherein a surface contour of the pushing surface matches a surface contour of the roller.

15. The laminated substrate separating device as claimed in claim 1, wherein the base has a plane and an inclined surface connected to each other, the laminated substrate is disposed on the plane, and the misaligned edge is located above the inclined surface and a gap exists therebetween, such that the first substrate is shifted to the inclined surface when being pressed by the separating tool.

16. A method for separating laminated substrate, adapted to separate a first substrate and a second substrate of a laminated substrate, wherein the first substrate and the second substrate are misaligned at at least one edge of the laminated substrate, the method for separating the laminated substrate comprising:
   disposing the laminated substrate on a base, wherein the laminated substrate exposes the misaligned edge;
   pressing the misaligned edge by a separating tool, wherein the separating tool has a bottom surface, a pushing surface, a sharp edge connected between the bottom surface and the pushing surface, and a plurality of third holes located on the pushing surface, so as to separate the first substrate and the second substrate;
   pressing the first substrate at the misaligned edge by the bottom surface, so as to form a gap between the first substrate and the second substrate;
   inserting the sharp edge into the gap;
   pushing the second substrate toward a roller by the pushing surface; and
   providing a pressure fluid to the pushing surface through the third holes, such that the separated portion of the second substrate is pushed by the pressure fluid to move to the roller.

17. The method for separating the laminated substrate as claimed in claim 16, wherein the roller has a plurality of first holes, and the method for separating the laminated substrate further comprising:
   moving the roller to the misaligned edge, and vacuum-absorbing a portion of the second substrate separated from the first substrate to the roller through the first holes; and
   rolling up the roller to curl the second substrate until the second substrate is completely separated from the first substrate.

18. The method for separating the laminated substrate as claimed in claim 16, wherein the base has a plurality of second holes, and the method for separating the laminated substrate further comprises:
   vacuum-absorbing the laminated substrate on the base through the second holes.

19. The method for separating the laminated substrate as claimed in claim 16, wherein a moving direction of the separating tool is opposite to a moving direction of the roller.

20. The method for separating the laminated substrate as claimed in claim 16, wherein when the laminated substrate is a polygon, the separating tool is moved to the misaligned edge along a direction, and the direction faces to a corner of the polygon.

21. The method for separating the laminated substrate as claimed in claim 16, wherein when the laminated substrate is a round, the separating tool is moved to the misaligned edge along a direction, and the direction is orthogonal to a tangent line of the round.

* * * * *